United States Patent [19]

Vedamuthu et al.

[11] 4,382,097

[45] May 3, 1983

[54] METHOD FOR THE PREPARATION OF NATURALLY THICKENED AND STABILIZED FERMENTED MILK PRODUCTS AND PRODUCTS PRODUCED THEREBY

[75] Inventors: Ebenezer R. Vedamuthu; Ramesh B. Shah, both of Bradenton, Fla.

[73] Assignee: Microlife Technics, Inc., Sarasota, Fla.

[21] Appl. No.: 259,451

[22] Filed: May 1, 1981

[51] Int. Cl.$^3$ .............. A23C 17/00; A23C 9/12; C12R 1/225; C12R 1/46
[52] U.S. Cl. .............. 426/43; 426/330.2; 435/853; 435/885
[58] Field of Search .............. 426/34, 42, 43, 330.2, 426/334, 583; 435/139, 885, 853, 854

[56] References Cited

U.S. PATENT DOCUMENTS

| | | | |
|---|---|---|---|
| 3,080,236 | 3/1963 | Ferguson | 99/59 |
| 3,235,387 | 2/1966 | Stumbo | 99/59 |
| 3,269,842 | 8/1966 | Mayer | 99/59 |
| 3,420,742 | 7/1969 | Farr | 195/59 |
| 3,539,363 | 11/1970 | Morgan | 99/212 |
| 3,932,680 | 1/1976 | Egli | 426/43 |
| 3,969,534 | 7/1976 | Pavey | 426/34 |
| 4,243,684 | 1/1981 | Pruss | 426/40 |

*Primary Examiner*—Raymond N. Jones
*Assistant Examiner*—Elizabeth J. Curtin
*Attorney, Agent, or Firm*—Ian C. McLeod

[57] ABSTRACT

A method for the preparation of naturally stabilized, thick bodied, fermented milk products by fermentation is described. Mixed cultures of milk fermenting, non-slime, lactic acid producing bacteria and slime producing *Streptococcus lactis, Streptococcus cremoris* or mixtures thereof having the thickening characteristics in milk of *Streptococcus cremoris* NRRL-B-12,361, 12,362 or 12,363 are used, preferably in addition with a diacetyl producing bacterium for flavor. The fermented milk products are thick bodied without any ropiness or sliminess and are stable to separation of whey from curd upon storage at refrigeration temperatures, with little or no added stabilizing agents such as gums and starches or thickening agents such as added non-fat milk solids. The preferred product is a thick bodied buttermilk.

17 Claims, No Drawings

METHOD FOR THE PREPARATION OF NATURALLY THICKENED AND STABILIZED FERMENTED MILK PRODUCTS AND PRODUCTS PRODUCED THEREBY

BACKGROUND OF THE INVENTION

The present invention relates to naturally stabilized, thick bodied fermented milk products which are produced by fermentation without the need for added stabilizing or thickening agents. In particular the present invention relates to a method which uses mixed cultures of milk fermenting, non-slime, lactic acid producing bacteria and slime producing *Streptococcus lactis, Streptococcus cremoris* or mixtures thereof having the thickening and stabilizing characteristics of *Streptococcus cremoris* NRRL-B-12,361, 12,362 or 12,363 for the fermentations.

PRIOR ART

Dairy products, such as yogurt and buttermilk, prepared by fermentation have a characteristic thick lumpy texture which is not uniformly cohesive and smooth when stirred and also these products have a tendency to "whey off" upon standing by the separation or shrinking of the curd which exudes the whey. Various additive stabilizing agents, such as plant gums, starches and cellulose derivatives, are used commercially in an attempt to improve the texture by making the products smoother and to improve the storage stability of the fermented milk products. U.S. Pat. Nos. 3,080,236; 3,235,387; 3,269,842; 3,539,363; 3,932,680 and 3,969,534 describe the use of various added stabilizers and are representative of this prior art practice which is widely used commercially. Such stabilizing agents add to the cost of the products and in addition introduce a sometimes unwanted ingredient into the fermented milk product. Generally non-fat milk solids are added to the fermented milk products prior to the fermentation in order to thicken them. Stabilizing agents are generally not added after the fermentation because microbial contamination will occur and the product will spoil faster. U.S. Pat. No. 4,243,684 shows the use of "ropy" cultures of lactic acid producing bacteria in place of non-ropy cultures for making cheese. Also ropy cultures are used in the Scandinavian countries to make ropy products. None of these products have the texture of the hereinafter described products of the present invention.

OBJECTS

It is therefore an object of the present invention to provide novel naturally thick bodied and stabilized, fermented milk products. It is further an object of the present invention to provide such thick bodied, fermented milk products which are relatively inexpensive to manufacture and which have a storage stability to wheying off which is at least equivalent to products which are produced with added stabilizing agents. Additionally, it is an object of the present invention to provide thick bodied, fermented milk products which have a unique silky smooth or "velvet" texture without any ropiness or sliminess by means of the use of selected slime producing strains of *Streptococcus lactis, Streptococcus cremoris* or mixtures thereof admixed with lactic acid producing bacteria. These and other objects will become increasingly apparent by reference to the following description.

DESCRIPTION OF THE INVENTION

The present invention relates to a thick bodied fermented milk product which comprises: milk with a pH between about 4.2 and 4.7 which has been fermented with a mixed culture containing a milk fermenting, non-slime, lactic acid producing bacteria and slime producing *Streptococcus lactis, Streptococcus cremoris* or mixtures thereof having the thickening and stabilizing characteristics of *Streptococcus cremoris* NRRL-B-12,361, 12,362 or 12,363 to produce the thick bodied milk product without need for addition of non-fat milk solids and without resulting in a slimy or ropy product, wherein the product is stable to separation of whey from curd upon storage at refrigeration temperatures without added stabilizing agents.

Further the present invention relates to the method of producing a thick bodied fermented milk product which comprises: providing in milk a mixed culture containing milk fermenting, non-slime, lactic acid producing bacteria which reduce the pH of the milk and slime producing *Streptococcus lactis, Streptococcus cremoris* or mixtures thereof having the thickening and stabilizing characteristics of *Streptococcus cremoris* NRRL-B-12,361, 12,362, or 12,363; and fermenting the milk with the culture to produce the thick bodied milk product without need for addition of non-fat milk solids and without resulting in a slimy or ropy product, wherein the product is stable to separation of whey from curd upon storage at refrigeration temperatures without added stabilizing agents.

*Streptococcus cremoris* NRRL-B-12,361 (which is preferred) is available along with NRRL-B-12,362 and NRRL-B-12,363 to anyone who requests it by number from the United States Department of Agriculture, Northern Regional Research Center, 1815 North University St. Peoria, Ill. 61604. Other related strains having the thickening characteristics of NRRL-B-12,361 can be selected from available cultures and tested by fermentation in milk. thus *Streptococcus cremoris* NRRL-B-12,362 and *Streptococcus cremoris* NRRL-B-12,363 were also found to have this characteristic. It is contemplated that genetic manipulation of any strain of *Streptococcus cremoris* or *Streptococcus lactis* by recombinant or mutagenic techniques could produce strains having the same essential fermentation characteristics of NRRL-B-12,361, 12,362 or 12,363 and it is intended that these be included in the present invention.

The fermentation characteristics of strains NRRL-B-12,361, 12,362 and 12,363 are particularly unique in that they have the ability to produce a silky smooth "velvet" texture in fermented milk in combination with nonslime, lactic acid producing bacteria, without any ropiness or sliminess. The term "ropiness" is defined as meaning the tendency of the milk to agglomerate into long strands as a result of the fermentation. The term "sliminess" refers to a product which is tacky such that the tongue tends to stick to the palate upon tasting. An example of "sliminess" is the slick feel of the white of a raw egg. It is a characteristic of a few strains of *Streptococcus lactis* and *Streptococcus cremoris* that in pure culture they produce fermented milk products which are ropy and slimy, characteristics which are undesirable. In the present invention, when these selected slime producing strains of *Streptococcus lactis* and/or *Streptococcus cremoris* are mixed in specific proportions with other traditionally used non-slime, lactic acid bacteria, ropy or slimy characteristics contributed by the slime producing *Streptococcus lactis* and/or *Streptococcus cremoris* are overcome. The result is a uniformly smooth, velvety, non-slimy product.

The mixed culture contains the traditional milk fermenting, non-slime lactic acid producing bacteria. Non-slime producing *Streptococcus lactis*, *Streptococcus cremoris*, *Streptococcus thermophilus*, *Lactobacillus bulgaricus*, *Lactobacillus acidophilus*, *Lactobacillus lactis*, including particularly NRRL-B-5628 or mixtures thereof can be uesd with flavor (diacetyl) producing bacteria such as *Streptococcus lactis* subspecies *diacetylactis* and *Leuconostoc cremoris*. Many other species of non-slime, *Streptococcus* and *Lactobacillus* commonly used in milk fermentations to generate lactic acid can be used.

In order to avoid the problem of sliminess or ropiness and to produce the thick body, it is necessary to include the milk fermenting, non-slime, lactic acid producing bacteria in a volume ratio of between about 1:9 and 4:1 bacterial cells per part by volume of the slime producing *Streptococcus lactis*, *Streptococcus cremoris* or mixtures thereof. The cells to be mixed are generally at the same concentration level per unit volume. Within this range, variations in product body can occur depending upon the specific strain of slime producing *Streptococcus lactis* and/or *Streptococcus cremoris* selected.

The slime producing bacteria for the cultures can be grown in milk or other suitable media to a level of at least about $10^8$ cells per milliliter of growth medium. They can be used directly or they can be concentrated above the level of growth by various conventional means such as by centrifugation of ultrafiltration by dialysis of the growth medium to a higher cell count level, particularly above about $10^{10}$ cells per milliliter up to about $10^{12}$ cells per milliliter as is known to those skilled in the art. Cell counts are based upon the number of chains or colony forming units (CFU).

The slime producing cultures and the non-slime producing cultures can be added to milk as individual single strain preparations (concentrated or non-concentrated) or the slime producing cultures (concentrated or non-concentrated) can be mixed with non-slime producing cultures (concentrated or non-concentrated) and then added directly to milk.

Also, milk can be inoculated with single or mixed strain slime producing culture (concentrated or non-concentrated) and milk can be separately inoculated wih single or mixed strain non-slime producing culture (concentrated or non-concentrated). Both inoculated milks are fermented at 10°-32° C. and then the resultant ropy body buttermilk can be blended with the resultant normal body buttermilk to produce a non-ropy, non-slimy, naturally stabilized, thick bodied buttermilk.

When concentrates of slime producing and non-slime producing cultures are prepared and stored for any length of time prior to preparation of the fermented milk product, freezing stabilizing agents can be added for freezing or the concentrate can be lyophilized in a manner conventionally known to the prior art. U.S. Pat. No. 3,420,742 illustrates a preferred method for the preparation of the bacterial concentrates which are frozen for storage with a freezing stabilizing agent such as glycerol or the like. The bacterial concentrate can be prepared from culture grown in a medium inoculated with a certain ratio of slime producing to non-slime producing *Streptococcus lactis* strains, *Streptococcus cremoris* strains or mixtures thereof or the individual slime producing and non-slime producing strains can be prepared separately and then blended together in the desired ratio of slime producing *Streptococcus cremoris* and/or *Streptococcus lactis* to non-slime, lactic acid producing bacteria along with *Leuconostoc cremoris* and *Streptococcus lactis* subspecies *diacetylactis* flavor producing bacteria prior to freezing. Many different freezing stabilizing agents which maintain viability of the bacteria upon storage are known to those skilled in the art.

Inoculated milk is fermented with the mixed culture at temperature between about 10° to 32° C., preferably 24° C. The fermentation is generally conducted for between about 12 to 18 hours. The milk usually contains less than nine percent (9%) milk solids; however, between 8 and 14 percent solids can be present.

The resulting thick bodied, fermented milk products can be marketed with the bacteria in a viable form in a cooled product to restrict continuing fermentation. Alternatively, the product can be marketed with the bacteria killed such as by pasteurization, after the fermentation. Such products are more stable to storage at ambient room temperatures of 15° to 21° C. They can be mixed with fruits or other flavorings.

SPECIFIC DESCRIPTION

The following examples demonstrate the preparation of the fermented milk products of the present invention utilizing the mixed cultures of a lactic acid producing bacterium and *Streptococcus cremoris* NRRL-B-12,361, B-12,362 and B-12,363. Examples 1-4 illustrate the growth of the bacteria, the preparation of the bacterial culture mixtures and the preparation of the fermented milk products using the bacterial cultures.

EXAMPLE 1

A growth medium comparable to that described in U.S. Pat. Nos. Re. 28,276 and 28,488 was prepared, heat-treated and cooled to 24° C. The medium was inoculated at the rate of 0.89 volume percent with a 10 to 12 hour milk culture inoculum consisting of 40 volume percent of NRRL-B-12,361 and 60 volume percent of *Streptococcus lactis* and/or *Streptococcus cremoris* non-slime producing mixed strains. No attempt was made to determine the exact composition of the mixed non-slime producing culture since it made no difference.

The inoculated medium was held at 24° C. with constant neutralization at pH 5.8 until carbohydrate was depleted. The bacteria were removed from the spent medium by centrifugation to about $50 \times 10^9$ cfu per ml and were blended with 10 weight percent of a concentrate of *Leuconostoc cremoris* containing about $1 \times 10^9$ cfu per ml. Ten weight percent of sterile glycerol was added and the resultant thoroughly mixed concentrate was packaged in appropriate containers and was quick-frozen and stored at −34° C.

After storage, the concentrated culture was removed from freezer and placed into 32° C. water bath to thaw. Skim milk containing 9% solids-not-fat was heat-treated at 180° F. for 30 minutes and cooled to 24° C. The milk was inoculated at rate of 0.567 ml of the thawed concentrated culture per 3785 ml milk. Control milk was inoculated with a commercial concentrate of non-slime producing strains of *Streptococcus lactis* and/or *Streptococcus cremoris* at same rate.

The inoculated milk was incubated at 24° C. for 16 hours, chilled to 10° C., thoroughly mixed to break curd and evaluated organoleptically. The control buttermilk inoculated with non-slime producing strains of *Streptococcus lactis* and/or *Streptococcus cremoris* had thin body characteristics of buttermilk made with unfortified, nonstabilized skim milk. The test buttermilk inoculated with mixture of slime and non-slime producing strains of *Streptococcus lactis* and/or *Streptococcus cremoris* had a thick silky smooth "velvet" texture which was not ropy or slimy. The body was comparable in mouth feel (but not in viscosity by Zahn cup measurement per Example 4) to buttermilk made with skim milk fortified with 1% solids-not-fat and inoculated with usual, non-slime producing strains.

EXAMPLES 2

Buttermilk made with various ratios of slime producing NRRL-B-12,361 to non-slime producing *Streptococcus lactis* and/or *Streptococcus cremoris*

Skim milk (containing 9% solids-not-fat by test) was heat-treated at 180° F. for 30 minutes and cooled to 24° C. Buttermilk was made by inoculating the milk with various mixtures of slime producing *Streptococcus cremoris* NRRL-B-12,361 and non-slime producing *Streptococcus lactis* and/or *Streptococcus cremoris* strains which contained about $1 \times 10^9$ cfu per ml at rate of 1 ml of overnight culture (sterile 11% NFDM incubated at 24° C. for 16 hours) per 100 ml of milk.

The inoculated milk was incubated 16 hours at 24° C., chilled to 10° C. thoroughly mixed to break curd and evaluated organoleptically. The results are shown in Table I.

TABLE I

| Slime Producing S. cremoris NRRL-B-12,361 | Non-Slime Producing Mixed S. lactis and/or S. Cremoris strains | Texture of Buttermilk |
|---|---|---|
| 90% (volume) | 10% (volume) | Ropy, "snotty" defect |
| 80% | 20% | Ropy, "snotty" defect |
| 75% | 25% | Too viscous |
| 50% | 50% | Thick, not viscous, not ropy, not slimy |
| 40% | 60% | Thick, not viscous, not ropy, not slimy |
| 30% | 70% | Not as thick as above, but thicker than control |
| 20% | 80% | Comparable to above |
| 0 | 100% | Thin body characteristic of unfortified, non-stabilized buttermilk. |

The results in Table I show that an inoculum consisting of anything more than about 80% by volume of slime producing *Streptococcus cremoris* NRRL-B-12,361 results in a product which is characterized by the prior art as being "snotty" or ropy. An inoculum containing less than 40% by volume of NRRL-B-12,361 resulted in a fermented product which was slightly thicker than regular buttermilk in texture. Thus the thick velvety, non-slimy texture was obtained only in a narrow ratio range of NRRL-B-12,361 to non-slime forming *Streptococcus cremoris* and/or *Streptococcus lactis* which will vary depending upon specific slime producing strains used as can be seen from Example 3.

EXAMPLE 3

Buttermilk made with various ratios of slime producing *Streptococcus cremoris* NRRL-B-12,362 to non-slime producing *Streptococcus lactis* and/or *Streptococcus cremoris*

Buttermilk was made as in Example 2 above and results are shown in Table II.

TABLE II

| Slime Producing S. cremoris NRRL-B-12,362 | Non-slime Producing Mixed S. lactis and/or S. cremoris | Texture of Buttermilk |
|---|---|---|
| 45% (volume) | 55% (volume) | Ropy, "snotty" defect |
| 33.3% | 66.6% | Too viscous, not ropy |
| 20% | 80% | Thick, not viscous, not ropy, not slimy |
| 0% | 100% | Thin body characteristic of unfortified, non-stabilized buttermilk |

The results in Table II show that an inoculum consisting of anything more than about 45% by volume of slime producing *Streptococcus cremoris* NRRL-B-12,362 results in a product which is characterized by the prior art as being "snotty" or ropy.

EXAMPLE 4

Buttermilk was made from unfortified skim milk treated as in Example 2. The skim milk was inoculated with different ratios of slime producing *Streptococcus cremoris* strains to non-slime producing mixed *Streptococcus lactis* and *Streptococcus cremoris* strains. (Inoculum consisted of 16 hours at 24° C. milk cultures at rate of 1 ml per 100 ml of milk.) Inoculated skim milk was incubated for 16 hours at 24° C. and viscosity of resultant buttermilk was determined with Zahn Viscosimeter cups No. −002 and −004 (CSC Scientific Company Chicago Ill. 60623, CSC NO. 027134). Viscosity is expressed as Centipoises. After viscosity determination, buttermilk was chilled to 10° C. and evaluated organoleptically. The results are shown in Table III.

TABLE III

| Slime Producing Culture Number | Inoculum volume percent ratio | | Centipoises at 25° C. | Organoleptic Evaluation of Buttermilk Texture |
| | Slime Producer | Non-Slime Producer | | |
|---|---|---|---|---|
| NRRL-B-12,361 | 100 | 0 | 725 | Ropy, too mucoid |
| B-12,361 | 75 | 25 | 600 | Ropy, too mucoid |
| B-12,361 | 50 | 50 | 445 | Thick, not ropy |
| B-12,361 | 25 | 75 | 285 | Thinner than above |
| B-12,361 | 0 | 100 | 50 | Thin body characteristic of unfortified, non-stabilized buttermilk |
| NRRL-B-12,362 | 100 | 0 | 800 | Ropy, too mucoid |
| B-12,362 | 75 | 25 | 650 | Ropy, too mucoid |
| B-12,362 | 50 | 50 | 500 | Thick, slightly |

TABLE III-continued

| Slime Producing Culture Number | Inoculum volume percent ratio Slime Producer | Non-Slime Producer | Centipoises at 25° C. | Organoleptic Evaluation of Buttermilk Texture |
|---|---|---|---|---|
| | | | | ropy?? |
| B-12,362 | 25 | 75 | 425 | Thick, not ropy |
| B-12,362 | 0 | 100 | 50 | Thin body characteristic of unfortified, non-stabilized buttermilk |
| NRRL-B-12,363 | 100 | 0 | 300 | Ropy, mucoid |
| B-12,363 | 75 | 25 | 225 | Thick, not ropy |
| B-12,363 | 50 | 50 | 60 | Thinner than above |
| B-12,363 | 25 | 25 | 50 | Thin body... |
| B-12,363 | 0 | 100 | 50 | Thin body... |

The fermented milk products preferably have a Zahn cup viscosity between about 60 and 500 centipoises; however, mouth feel is the preferred method of determining the desirable thick texture of the products of the present invention.

Unexpectedly the buttermilk of the present invention have the same mouth feel when made from skim milk as buttermilk made from 1 to 2 percent by weight cream added to milk and fermented with conventional cultures. The present invention also allows the elimination of a portion of the conventionally added milk solids in sour cream.

We claim:

1. A thick bodied liquid, fermented milk product which comprises: milk with a pH between about 4.2 and 4.7 which has been fermented with a mixed culture containing a milk fermenting, non-slime, lactic acid producing bacteria and slime producing *Streptococcus lactis, Streptococcus cremoris* or mixtures thereof having the thickening and stabilizing characteristics of *Streptococcus cremoris* NRRL-B-12,361, 12,362 or 12,363 to produce the thick bodied milk product without need for added milk solids and without resulting in a slimy or ropy product, wherein the product is stable to separation of whey from curd upon storage at refrigeration temperatures without added stabilizing agents, said slime producing *Streptococcus lactis* or *Streptococcus cremoris* alone further being capable of producing a Zahn cup viscosity of about 300 centipoises or above when incubated in milk for 16 hours at 24° C.

2. The product of claim 1 whrein the mixed culture in addition contains *Leuconostoc cremoris, Streptococcus lactis* subspecies *diacetylactis* or mixtures thereof to impart a diacetyl flavor to the product and the product is a thick bodied buttermilk or sour cream.

3. The product of claim 1 which has been fermented at between about 10° C. to 32° C.

4. The product of claim 1 wherein the slime producing *Streptococcus cremoris* has essentially the milk fermentation characteristics of NRRL-B-12361.

5. The product of claim 1 wherein the slime producing *Streptococcus cremoris* is NRRL-B-12,361.

6. The product of claim 1 wherein the slime producing *Streptococcus cremoris* is NRRL-B-12,362.

7. The product of claim 1 wherein the slime producing *Streptococcus cremoris* is NRRL-B-12,363.

8. The product of claim 1 wherein the fermentation has been completed in 12 to 18 hours at 24° C.

9. The product of claim 1 which is mixed with additional flavoring.

10. The product of claim 9 wherein the flavoring is a fruit flavor.

11. The product of claim 1 wherein the bacteria after the fermentation are viable in the product cooled so as to retard continuing fermentation.

12. The product of claim 1 wherein the bacteria are rendered non-viable after the fermentation.

13. The product of claim 1 wherein the non-slime, lactic acid producing bacteria are non-slime producing strains of *Streptococcus lactis, Streptococcus cremoris, Streptococcus thermophilus, Lactobacillus bulgaricus, Lactobacillus acidophilus, Lactobacillus lactis* including *Lactobacillus lactis* NRRL-B-5628 or mixtures thereof.

14. The method of producing a thick bodied liquid fermented milk product which comprises:
(a) providing in milk a mixed culture containing milk fermenting, non-slime, lactic acid producing bacteria which reduce the pH of the milk and a slime producing *Streptococcus lactis, Streptococcus cremoris* or mixtures thereof having the thickening and stabilizing characteristics of *Streptococcus cremoris* NRRL-B-12,361, 12,362, or 13,363, said slime producing *Streptococcus lactis* or *Streptococcus cremoris* alone further being capable of producing a Zahn cup viscosity of about 300 centipoises or above when incubated in milk for 16 hours at 24° C.; and
(b) fermenting the milk with the culture to produce the thick bodied milk product without need for addition of non-fat milk solids and without resulting in a slimy or ropy product, wherein the product is stable to separation of whey from curd upon storage at refrigeration temperatures without added stabilizing agents.

15. The method of claim 14 wherein the fermentation is for 12 to 18 hours at 24° C.

16. The method of claim 14 wherein the lactic acid producing bacteria are non-slime producing strains of *Streptococcus lactis, Streptococcus cremoris, Streptococcus thermophilus, Lactobacillus bulgaricus, Lactobacillus acidophilus, Lactobacillus lactis* including *Lactobacillus lactis* NRRL-B-5628 with *Leuconostoc cremoris, Streptococcus lactis* subspecies *diacetylactis* or mixtures thereof for producing a diacetyl flavor and wherein the product is buttermilk or sour cream.

17. The method of claim 14 wherein the milk product contains about 14 percent or less by weight non-fat milk solids.

* * * * *